US007600071B2

(12) United States Patent
Seewann

(10) Patent No.: US 7,600,071 B2
(45) Date of Patent: Oct. 6, 2009

(54) CIRCUIT HAVING RELAXED SETUP TIME VIA RECIPROCAL CLOCK AND DATA GATING

(75) Inventor: Ed Seewann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 11/567,941

(22) Filed: Dec. 7, 2006

(65) Prior Publication Data
US 2008/0137468 A1    Jun. 12, 2008

(51) Int. Cl.
*G06F 12/00*    (2006.01)
(52) U.S. Cl. ...................................... 711/108; 365/205
(58) Field of Classification Search ................ 711/108, 711/100, 103, 154; 365/189, 230.03, 230.01, 365/205, 241
See application file for complete search history.

(56) References Cited
U.S. PATENT DOCUMENTS

| | | | |
|---|---|---|---|
| 5,097,157 A * | 3/1992 | Jaffe et al. .................. | 365/205 |
| 5,132,990 A | 7/1992 | Dukes | |
| 5,521,834 A * | 5/1996 | Crafts et al. ................... | 716/6 |
| 5,748,157 A | 5/1998 | Eason | |
| 5,867,453 A | 2/1999 | Wang et al. | |
| 5,883,850 A * | 3/1999 | Lee et al. ............... | 365/230.03 |
| 5,912,570 A | 6/1999 | Kuusisto | |
| 7,035,127 B1 | 4/2006 | Adams et al. | |
| 7,079,042 B2 | 7/2006 | Reim | |
| 2002/0021470 A1 * | 2/2002 | Savoj ......................... | 359/158 |

FOREIGN PATENT DOCUMENTS

WO    WO 01/04906 A1    1/2001

OTHER PUBLICATIONS

U.S. Appl. No. 11/558,495, filed Nov. 10, 2006, Randall R. Heisch.
"Fantazein TM, The Programmable Message Clock, Displays Time, Date and Messages Floating Miraculously in Space.Persistance of Vision Time, Date & Message Float in Mid-Air"; http://www.luberth.com/help/FANTASIZEI.HTM, 1 page.
"Sharper Image: Clocks: XP3 Programmable Message Clock"; http://www.sharperimage.com/us/en/catalog/productdetails/sku_F1123; 1 page.
"Fantazein: How it Works"; http://www.fantazein.com/how.html; 2 pages.
Randy H. Katz, Contemporary Logic Design, Chapter 6 Sequential Logic Design, pp. 288-292, The Benjamin/Cummings Publishing Company Inc., 1994.

\* cited by examiner

*Primary Examiner*—Pierre-Michel Bataille
(74) *Attorney, Agent, or Firm*—Dillon & Yudell, LLP

(57) ABSTRACT

An integrated circuit includes a circuit output, a data input that receives a data signal, and a clock input that receives a clock signal. The integrated circuit further includes first and second logic gates. The first logic gate has a first input coupled to the clock input, a second input coupled to the data input, and an output and a second logic gate. The second logic gate has a first input coupled to the data input, a second input coupled to the output of the first logic gate, and an output coupled to the circuit output. Setup time of the data signal relative to the clock signal at the second logic gate is improved by reciprocal gating of the data and clock signals.

20 Claims, 4 Drawing Sheets

CIRCUIT HAVING RELAXED SETUP TIME VIA RECIPROCAL CLOCK AND DATA GATING

CROSS-REFERENCE TO RELATED APPLICATION

The present application is related to U.S. patent application Ser. No. 11/567,958 which is filed concurrently herewith and incorporated herein by reference in its entirety.

BACKGROUND OF THE INVENTION

1. Technical Field

The present invention relates in general to integrated circuits.

2. Description of the Related Art

In many conventional integrated circuits, circuit operation is timed utilizing a clock signal, which synchronizes the flow of data signals through the circuit. A key design consideration for such clocked circuits is the timing requirements of the data signal(s) with reference to the clock signal, including the setup and hold times for the data signal(s). The setup time refers to the required relative arrival times of the clock and data signals. Hold time refers to the time following a clock pulse during which the data signal must remain stable in order to guarantee that the data passed to the next circuit stage is correct. If circuit timing requirements are not met, for example, if a data signal fails to meet the required setup time, the circuit may output incorrect data, possibly cascading to cause a larger system error or failure.

Because integrated circuits embodying the same circuit design in practice experience a range of timing behaviors due to a number of conditions, like temperature, voltage reference variations, fabrication process variations, etc., the timing analysis phase of the circuit design process typically includes so-called "corner" analysis in order to qualify an integrated circuit design across a wide range of conditions. In performing corner analysis, the operative assumption is that if a design works under each extreme condition, then assuming monotonic behavior, the design is also qualified for all intermediate conditions.

To enable a circuit design to pass corner analysis, timing requirements are often relaxed by the addition of excess timing margin to the circuit timing, thus enabling the timing requirements to be met across a wide range of conditions. As will be appreciated, the introduction of excess timing margin in a circuit design, while ensuring correct circuit operations, will eventually cause to circuit to fail its performance requirements.

SUMMARY OF THE INVENTION

In view of the foregoing, the present invention appreciates that it would be desirable to enable an integrated circuit to meet its setup time through improvements in the circuit design itself rather than the mere addition of timing margin to the design.

In one embodiment, an integrated circuit includes a circuit output, a data input that receives a data signal, and a clock input that receives a clock signal. The integrated circuit further includes first and second logic gates. The first logic gate has a first input coupled to the clock input, a second input coupled to the data input, and an output and a second logic gate. The second logic gate has a first input coupled to the data input, a second input coupled to the output of the first logic gate, and an output coupled to the circuit output. Setup time of the data signal relative to the clock signal at the second logic gate is improved by reciprocal gating of the data and clock signals.

In another embodiment, a memory circuit includes a plurality of memory cells that generate a plurality of matchline signals and a plurality of wordline driver circuits each coupled to receive a respective one of the matchline signals. Each of the plurality of wordline driver circuits includes first and second logic gates. The first logic gate has a first input coupled to the clock input, a second input coupled to the data input, and an output and a second logic gate. The second logic gate has a first input coupled to the data input, a second input coupled to the output of the first logic gate, and an output coupled to the circuit output. Setup time of the matchline signal relative to the clock signal at the second logic gate is improved by reciprocal gating of the data and clock signals.

In still another embodiment, a processor includes a cache memory that employs real addresses, a plurality of execution units for executing instructions, an instruction sequencing unit that fetches instructions from the cache memory for execution by the execution units, and an effective-to-real address translation table that translates effective addresses to real addresses to permit access to the cache memory. The effective-to-real address translation table includes a plurality of content addressable memory cells for storing effective addresses, a plurality of wordline driver circuits, and a random access memory. The plurality of content addressable memory cells generates a plurality of matchline signals in response to an input effective address. The plurality of wordline driver circuits are each coupled to receive a respective one of the matchline signals. Each wordline driver circuit includes a circuit output, a data input that receives the matchline signal, a clock input that receives a clock signal, and first and second logic gates. The first logic gate has a first input coupled to the clock input, a second input coupled to the data input, and an output and a second logic gate. The second logic gate has a first input coupled to the data input, a second input coupled to the output of the first logic gate, and an output coupled to the circuit output. Setup time of the matchline signal relative to the clock signal at the second logic gate is improved by reciprocal gating of the data and clock signals. The random access memory has a plurality of entries corresponding in number to the plurality of content addressable memory cells. Each entry of the plurality of entries includes a wordline that is asserted to read out a real address stored in that entry, and each of the wordlines is coupled to the circuit output of a respective one of the plurality of wordline driver circuits.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
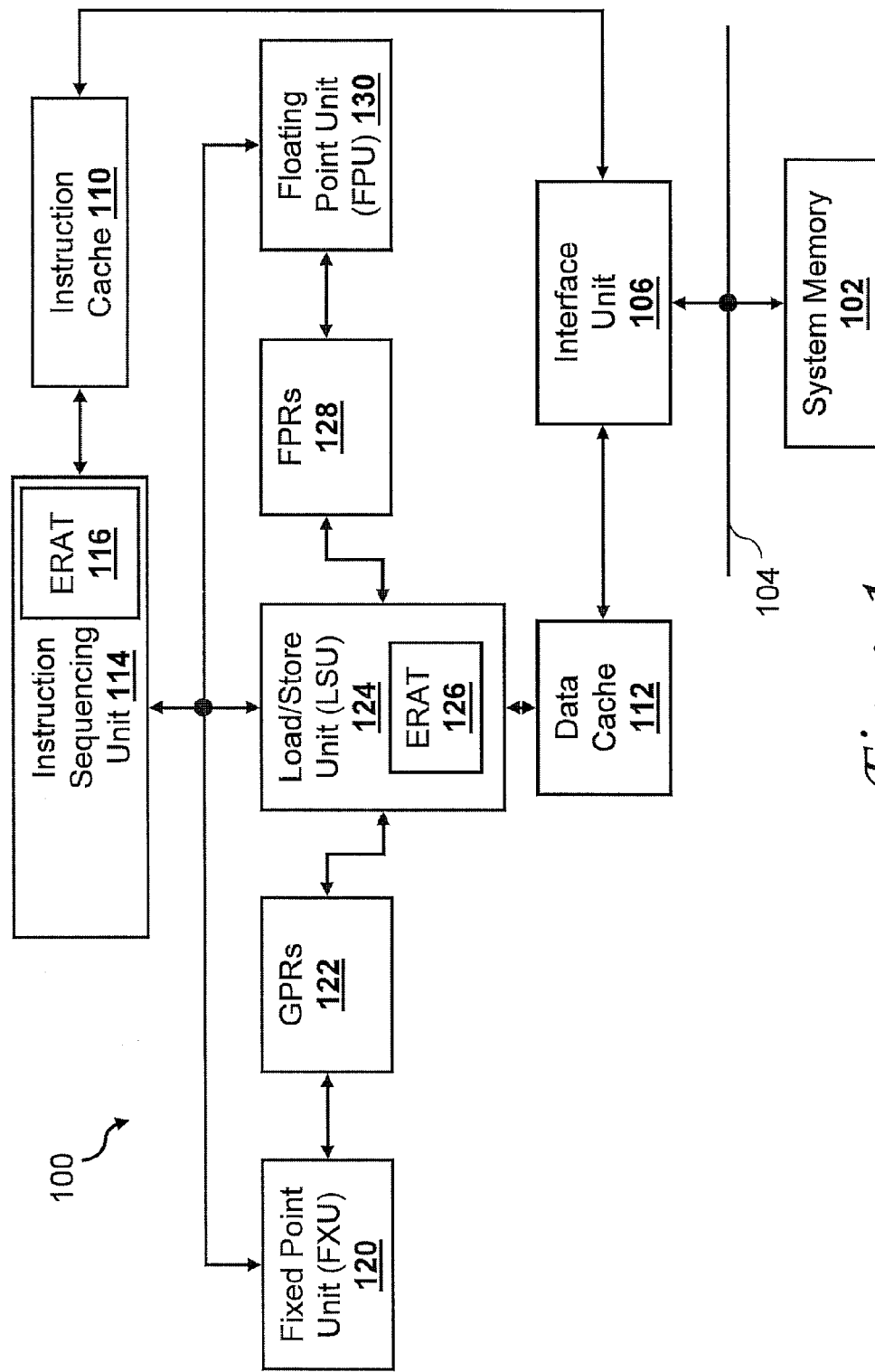
FIG. 1 is a high level block diagram of an exemplary integrated circuit in accordance with the present invention.

With reference now to FIG. 1, there is illustrated a high level block diagram of an exemplary embodiment of an integrated circuit 100 in accordance with the present invention. In the depicted embodiment, integrated circuit 100 comprises a superscalar processor, such as one of the POWER line of processors available from IBM Corporation of Armonk, N.Y., in which various execution units, registers, buffers, memories, and other functional units are all formed of integrated circuitry.

As illustrated in FIG. 1, integrated circuit 100 may be coupled via an interface unit 106 to an interconnect fabric 104 to form a larger data processing system such as a server computer system. Integrated circuit 100 includes an on-chip cache subsystem including bifurcated level one (L1) instruction and data caches 110 and 112, respectively, to provide low latency access to cache lines corresponding to memory locations in a system memory 102 coupled to interconnect fabric 104.

Instructions are fetched from instruction cache 110 and ordered for processing by instruction sequencing unit 114, which includes effective-to-real address translation (ERAT) table 116 for translating effective instruction fetch addresses generated by ISU 114 into the real addresses employed by instruction caches 110 and system memory 102. ISU 114 dispatches instructions according to instruction type. That is, fixed-point, load-store and floating point instructions are dispatched to fixed-point unit (FXU) 120, a load-store unit (LSUs) 124, and floating-point unit (FPU) 130, respectively. As further depicted in FIG. 1, LSU 124 further includes an ERAT table 126 for translating the target effective addresses of data accesses into the real addresses employed by data cache 112 and system memory 102.

Each of execution units 120, 124 and 130 is preferably implemented as an execution pipeline having a number of pipeline stages. During execution within one of execution units 120, 124 and 130, an instruction receives operands, if any, from one or more architected and/or rename registers within a register file (i.e., general purpose registers (GPRs) 122 or floating-point registers (FPRs) 128) coupled to the execution unit. After an execution unit finishes execution of an instruction, the execution unit notifies ISU 114, which schedules completion of instructions in program order.

Figure 2:
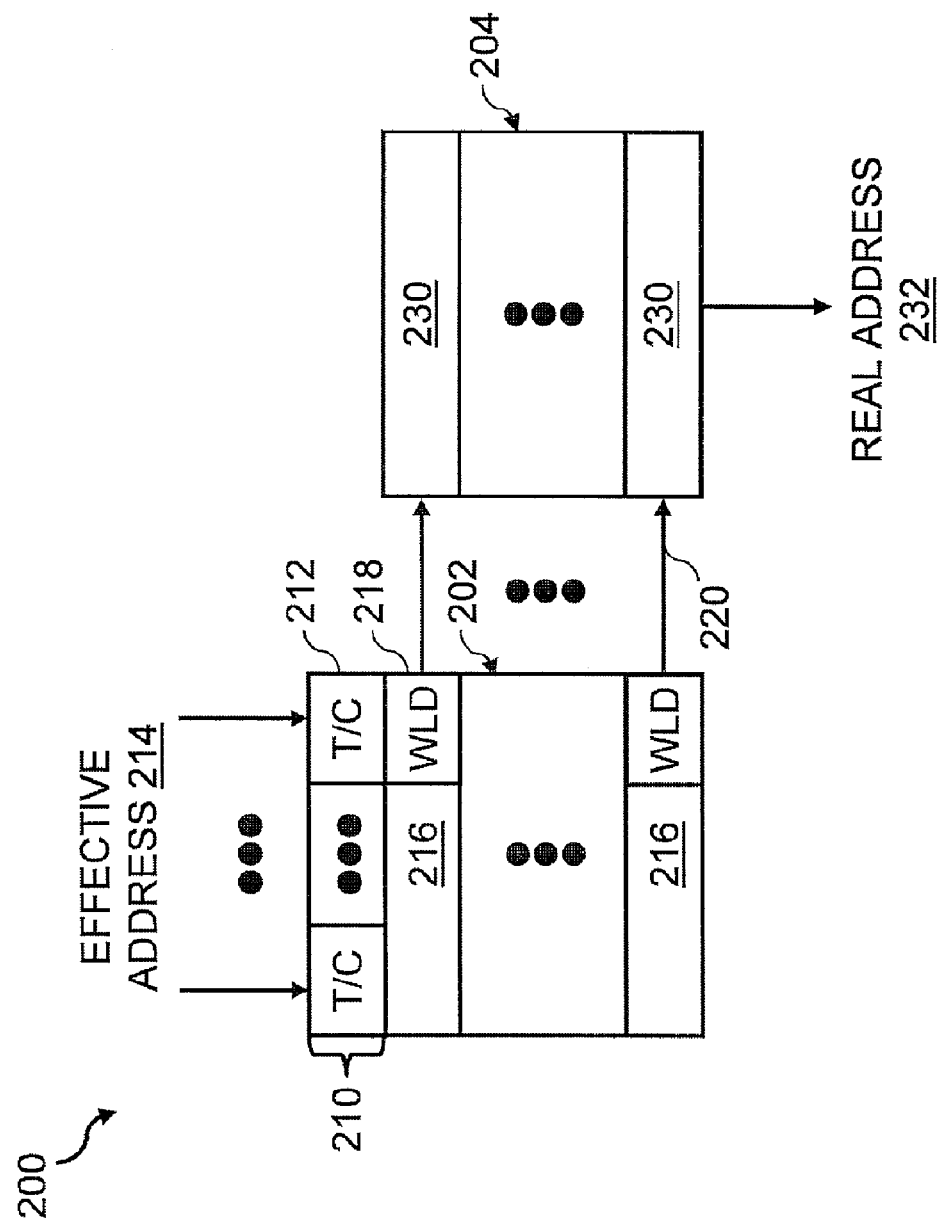
FIG. 2 is a more detailed view of an effective-to-real address translation (ERAT) circuit in the integrated circuit of FIG. 1.

Referring now to FIG. 2, there is depicted a high level block diagram of an exemplary embodiment of an ERAT table 200, which can be utilized to implement ERAT tables 116, 126 of FIG. 1. In the depicted embodiment, ERAT table 200 includes a content addressable memory (CAM) 202 and a random access memory (RAM) 204. CAM 202 has an input stage 210 comprising N true/complement (T/C) generators 212, which generate true and complement signals for each of the N bits of an input effective address 214. The true and complement signals are provided to each of a number (e.g., 128) of CAM entries 216, which each stores an effective address for which a translation has been obtained. Each CAM entry 216 has an associated word line driver (WLD) circuit 218 that asserts its wordline 220 to indicate an match between the effective address stored in the associated CAM entry 216 and the input effective address 214.

Still referring to FIG. 2, RAM 204 contains a number (e.g., 128) of entries 230. Each entry 230 is associated with a respective one of CAM cells 216 and contains a real address corresponding to the effective address buffered in the associated CAM entry 216. Thus, when a wordline 220 is asserted by a WLD circuit 218, the real address 232 corresponding to the input effective address 214 is output from RAM 204 to provide an address translation.

Figure 3:
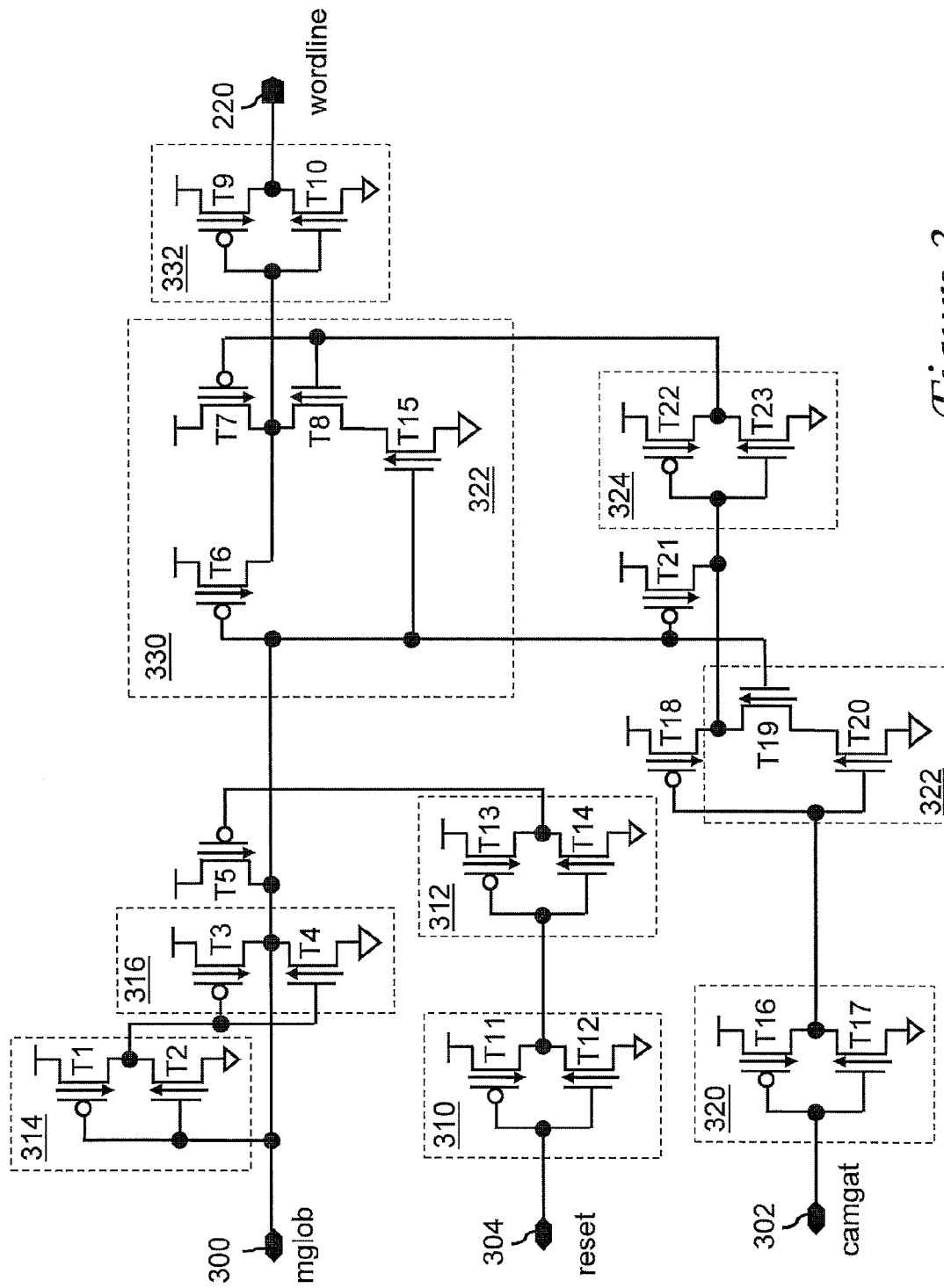
FIG. 3 is a more detailed view of the content addressable memory (CAM) wordline driver circuit of FIG. 2.

With reference to FIG. 3, there is illustrated a more detailed view of a WLD circuit 218 within ERAT table 200 of FIG. 2. In accordance with the present invention, the setup time requirement (also referred to as "strobe margin") of WLD circuit 218 is relaxed by interconnecting the circuit elements so that the clock signal utilized to time circuit operation both gates and is gated by the data signal.

As depicted, WLD circuit 218 has as a data input mglob 300, which receives the global matchline signal provided by the CAM entry 216 containing WLD circuit 218. Mglob 300 is biased to a logic high value ('1') and asserted to a logic low value ('0') to signal a CAM miss. WLD circuit 218 also has a clock input camgat 302, which receives a one-shot logic low pulse that acts as the clock or "strobe" for WLD circuit 218, and one output, namely, wordline 220. As noted above, wordline 220 is asserted to a logic high value to access a real address in RAM 204.

WLD circuit 218 further includes a reset input 304, which receives a one-shot logic high pulse to reset (precharge) mglob 300 to a logic high value following evaluation in response to the strobe of camgat 302. Reset input 304 is coupled via two input inverters 310 and 312 comprising transistors T11, T12 and T13, T14, respectively, to the gate of precharge transistor T5. When reset input 304 transitions from logic high to logic low, precharge transistor T5 is turned on to restore mglob 300 to a logic high state. The logic high state is retained by a keeper circuit comprising a first keeper inverter 314 formed by transistors T1 and T2 and the second keeper inverter 316 formed by transistors T3 and T4. The input of first keeper inverter 314 is connected to mglob 300, and the output of first keeper inverter 314 is connected to the input of second keeper inverter 316. The output of second keeper inverter 316 is connected to mglob 300.

Camgat 302 is connected via a first clock inverter 320 comprising transistors T16 and T17 to the input of an AND gate 322 comprising transistors T19 and T20. AND gate 322 has a first input A at the gate of transistor T19, which is connected to data input mglob 300, a second input B at the gate of transistor T20, which is connected to the output of clock inverter 320, and an output C that is biased to a logic high value by transistor T18. A pull-up transistor T21 further has its gate connected to mglob 300 and a leg connected to output C to pull output C to a logic high value when mglob 300 has a logic low value. Thus, the logic state of output C is dependent upon, that is, gated by the global matchline signal received at mglob 300.

Output C of AND gate 322 is further connected to a second clock inverter 324 comprising transistors T22 and T23. The output of second clock inverter 324 is connected to input D of a two-input NAND gate 330 comprising transistors T6, T7, T8 and T15. The second input E of NAND gate 330 is connected to mglob 300. Output F of NAND gate 330 is coupled via inverter 332 comprising transistors T9 and T10 to wordline 220, the output of WLD circuit 218. By coupling the output of inverter 324 to input D of NAND gate 330 the logic value of output F of NAND gate 330, and thus the value of wordline 220, is timing dependent upon (i.e., gated by) the clock signal provided at camgat 302. Wordline 220 will only be asserted to a logic high state if mglob 300 has a logic high state and camgat 302 has a logic low state.

Figure 4:
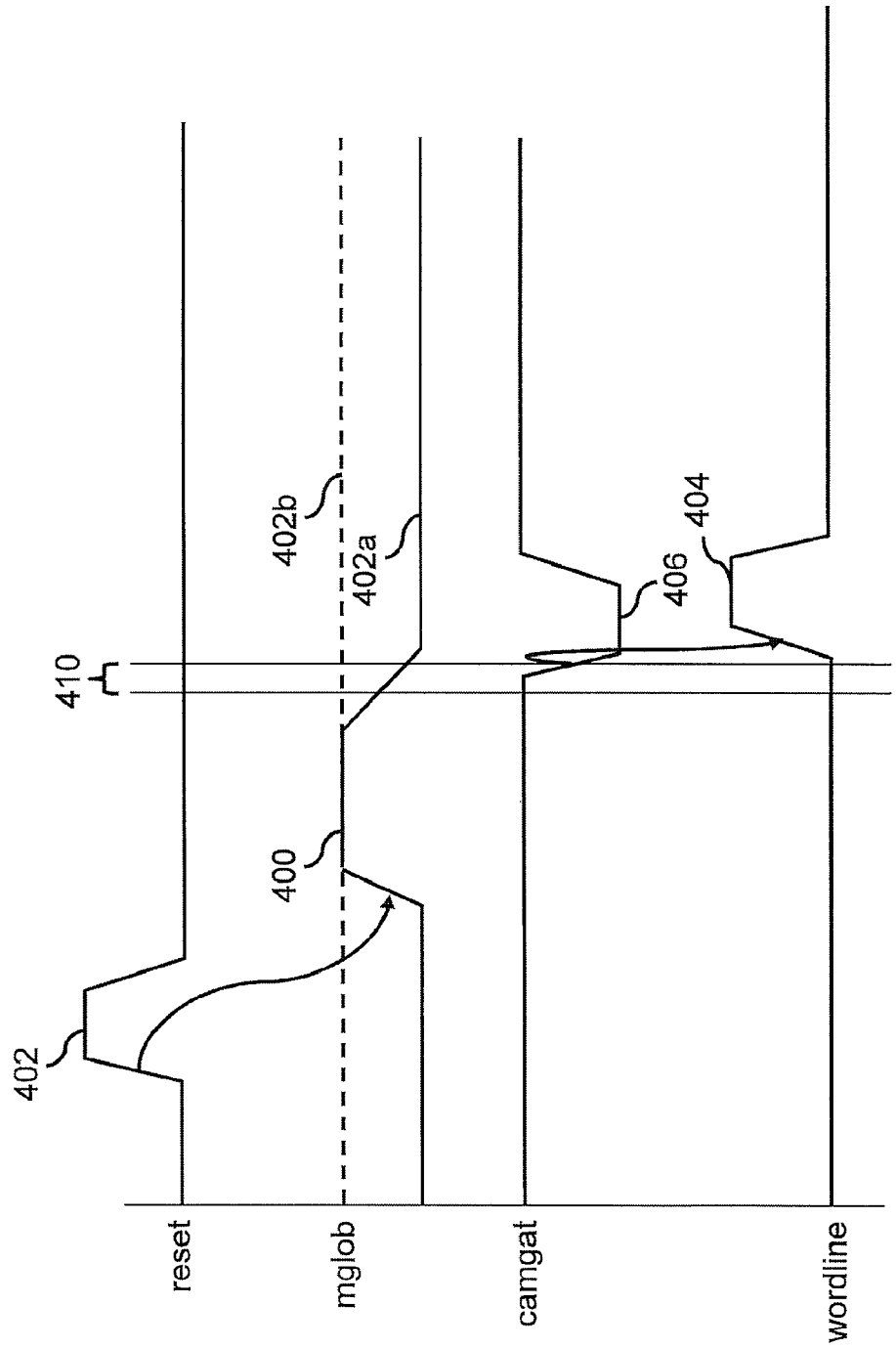
FIG. 4 is a timing diagram illustrated the operation of the CAM wordline driver circuit of FIG. 2.

Still referring to FIG. 3 and additionally to the timing diagram provided in FIG. 4, in operation CAM 202 is interrogated to locate a matching effective address, if any, by first precharging all data inputs mglob 300 to a logic high value, as shown at reference numeral 400, through the logic high assertion of reset input 304, as shown at reference numeral 402. Thereafter, each CAM entry 216 containing a non-matching effective address will discharge its respective data input mglob 300, as shown at reference numeral 402a. The single CAM entry 216, if any, containing a matching effective address retains its data input mglob 300 in a logic high state, as depicted at block 402b. As noted above, in the matching CAM entry 216, the combination of a logic high data input mglob 300 and a logic low clock input camgat 302 (as shown at reference numeral 406) will cause NAND gate 330 to fire wordline 220 (as shown at reference numeral 404) in order to access the corresponding entry 230 in RAM 204. Thus, for proper operation, it is imperative that data input mglob 300 is discharged to a logic low state in each non-matching CAM entry 216 before the arrival of a logic low pulse on camgat 302, yielding a positive setup time 410.

In conventional circuit designs, it is typical for a clock signal, such as camgat 302, to be pulsed or "fired" regardless of the state of corresponding data signal (e.g., the global matchline signal received at mglob 300). In such prior art circuit designs, observance of the setup time is a critical design factor address through rigorous corner analysis. In WLD circuit 218, however, input node D of NAND gate 330 will not pulse in response to a pulse received at camgat 302 if mglob 300 has a logic low state by virtue of the data gating imposed by AND gate 322. Consequently, setup time of WLD circuit 218 is relaxed.

As depicted in FIG. 4, the matchline signal appearing at mglob 300 has a relatively low slew rate, leaving a fairly long transition state in which mglob 300 is not completely high or completely low. As the arrival time of the global matchline signal at mglob 300 is pushed later and later relative to the arrival of the clock pulse at camgat 302, input node D of NAND gate 330 begins to glitch, where a glitch is defined herein as an electrical pulse of short duration having less than the design-specified minimum amplitude and/or duration. The leading edge of this glitch is delayed due to a less than full rail signal at mglob 300. As this glitch increases in amplitude, a glitch also develops at output node F of NAND gate 330. If the arrival time of the global matchline signal at mglob 300 is pushed even later, the glitch will propagate to wordline 220. Because in practice wordline 220 is replicated to drive multiple local bit lines within RAM 204, a glitch on wordline 220 creates a cumulative leakage that can falsely trigger a bit line. Thus, the critical timing setup timing constraint can be expressed as a "glitch based" setup timing requirement on wordline 220.

WLD circuit 218 suppresses glitches on wordline 220 more effectively than conventional circuit designs because the clock signal received at input D of NAND gate 330 is a function of (i.e., gated by) the global matchline signal received at mglob 300, leading to an improved setup time or strobe margin. In addition, WLD circuit 218 is more insensitive to fabrication process variations than conventional circuit designs. For example, in the StrongP/WeakN process corner, the global matchline signal received at mglob 300 falls even more slowly than the nominal case. However, the slow slew rate also delays the arrival of the clock signal at input D of NAND gate 330 and decreases its glitch amplitude.

It should be noted that the setup time improvement afforded by the reciprocal clock-data gating of the present invention is actually more pronounced in corners exhibiting the greatest disparity in the slew rates of the clock signal derived from the strobe received at camgat 302 and the global matchline signal received at mglob 300. For example, in the depicted embodiment in which the global matchline signal received at mglob 300 is subject to significant RC loading on the global matchline by the CAM entry 216, the slow slew rate exhibited by the global matchline signal is substantially independent of device characteristics. Thus, if the integrated circuit performs at greater than nominal speed (e.g., in the best case corner), the slew of the global matchline signal is relatively unchanged. Once the voltage at mglob 300 drops below the voltage rail, the data gating provided by AND gate 322 tends to retard the clock signal more than normally. The window of opportunity in which clock gating is effective consists of the time that the global matchline signal is in transition between its high and low states. Thus, if the duration of this transition stays about the same for both fast and nominal device speeds, the gating has a relatively larger window in which to work compared to device speed, resulting in a better relative setup time than in a slower corner.

While the invention has been particularly shown as described with reference to a preferred embodiment, it will be understood by those skilled in the art that various changes in form and detail may be made therein without departing from the spirit and scope of the invention.

What is claimed is:

1. An integrated circuit, comprising:
a circuit output;
a data input that receives a data signal;
a clock input that receives a clock signal;
a first logic gate having a first input coupled to the clock input, a second input coupled to the data input, and an output; and
a second logic gate having a first input coupled to the data input, a second input coupled to the output of the first logic gate, and an output coupled to the circuit output, wherein a setup time of the data signal relative to the clock signal at said second logic gate is improved by reciprocal gating of the data and clock signals.

2. The integrated circuit of claim 1, wherein each of said first logic gate and said second logic gate asserts its output if only if both of its first and second inputs are asserted.

3. The integrated circuit of claim 1, and further comprising:
a reset input that receives a reset signal; and
a precharge circuit coupled to said reset input and said data input, wherein said precharge circuit precharges said data input to a logic high state in response to assertion of the reset signal.

4. The integrated circuit of claim 1, wherein:
said second input of the first logic gate is directly connected to said data input; and
said second input of the second logic gate is coupled to said second input of said second logic gate through an intermediate logic gate.

5. The integrated circuit of claim 1, wherein:
said integrated circuit comprises a wordline driver circuit of a memory; and
said circuit output is coupled to a wordline of the memory.

6. A memory circuit, comprising:
a plurality of memory cells that generate a plurality of matchline signals; and
a plurality of wordline driver circuits each coupled to receive a respective one of the matchline signals, wherein each of the plurality of wordline driver circuits includes:
a circuit output;
a data input that receives a matchline signal among the plurality of matchline signals;
a clock input that receives a clock signal;
a first logic gate having a first input coupled to the clock input, a second input coupled to the data input, and an output; and a second logic gate having a first input coupled to the data input, a second input coupled to the output of the first logic gate, and an output coupled to the circuit output, wherein a setup time of the matchline signal relative to the clock signal at said second logic gate is improved by reciprocal gating of the matchline and clock signals.

7. The memory circuit of claim 6, wherein each of said first logic gate and said second logic gate asserts its output if only if both of its first and second inputs are asserted.

8. The memory circuit of claim 6, and further comprising:
a reset input that receives a reset signal; and
a precharge circuit coupled to said reset input and said data input, wherein said precharge circuit precharges said data input to a logic high state in response to assertion of the reset signal.

9. The memory circuit of claim 6, wherein:
said second input of the first logic gate is directly connected to said data input; and
said second input of the second logic gate is coupled to said second input of said second logic gate through an intermediate logic gate.

10. The memory circuit of claim 6, wherein said plurality of memory cells comprises a plurality of content addressable memory cells.

11. The memory circuit of claim 10, and further comprising:
a random access memory having a plurality of entries corresponding in number to said plurality of content addressable memory cells, wherein each entry of said plurality of entries includes a wordline that is asserted to read out contents of that entry, and wherein each of the wordlines is coupled to the circuit output of a respective one of the plurality of wordline driver circuits.

12. The memory circuit of claim 6, wherein said memory circuit comprises an effective-to-real address translation table.

13. A processor comprising:
a cache memory that employs real addresses;
a plurality of execution units for executing instructions;
an instruction sequencing unit that fetches instructions from the cache memory for execution by the execution units; and
a circuit within the processor including:
a circuit output;
a data input that receives a data signal;
a clock input that receives a clock signal;
a first logic gate having a first input coupled to the clock input, a second input coupled to the data input, and an output; and
a second logic gate having a first input coupled to the data input, a second input coupled to the output of the first logic gate, and an output coupled to the circuit output, wherein a setup time of the data signal relative to the clock signal at said second logic gate is improved by reciprocal gating of the data and clock signals.

14. The processor of claim 13, wherein each of said first logic gate and said second logic gate asserts its output if only if both of its first and second inputs are asserted.

15. The processor of claim 13, and further comprising:
a reset input that receives a reset signal; and
a precharge circuit coupled to said reset input and said data input, wherein said precharge circuit precharges said data input to a logic high state in response to assertion of the reset signal.

16. The processor of claim 13, wherein:
said second input of the first logic gate is directly connected to said data input; and
said second input of the second logic gate is coupled to said second input of said second logic gate through an intermediate logic gate.

17. A processor comprising:
a cache memory that employs real addresses;
a plurality of execution units for executing instructions;
an instruction sequencing unit that fetches instructions from the cache memory for execution by the execution units; and
an effective-to-real address translation table that translates effective addresses to real addresses to permit access to the cache memory, the effective-to-real address translation table including:
a plurality of content addressable memory cells for storing effective addresses, wherein said plurality of content addressable memory cells generates a plurality of matchline signals in response to an input effective address;
a plurality of wordline driver circuits each coupled to receive a respective one of the matchline signals, wherein each of the plurality of wordline driver circuits includes:
a circuit output;
a data input that receives a matchline signal among the plurality of matchline signals;
a clock input that receives a clock signal;
a first logic gate having a first input coupled to the clock input, a second input coupled to the data input, and an output; and
a second logic gate having a first input coupled to the data input, a second input coupled to the output of the first logic gate, and an output coupled to the circuit output, wherein a setup time of the matchline signal relative to the clock signal at said second logic gate is improved by reciprocal gating of the matchline and clock signals; and
a random access memory having a plurality of entries corresponding in number to said plurality of content addressable memory cells, wherein each entry of said plurality of entries includes a wordline that is asserted to read out a real address stored in that entry, and wherein each of the wordlines is coupled to the circuit output of a respective one of the plurality of wordline driver circuits.

18. The processor of claim 17, wherein each of said first logic gate and said second logic gate asserts its output if only if both of its first and second inputs are asserted.

19. The processor of claim 17, and further comprising:
a reset input that receives a reset signal; and
a precharge circuit coupled to said reset input and said data input, wherein said precharge circuit precharges said data input to a logic high state in response to assertion of the reset signal.

20. The processor of claim 17, wherein:
said second input of the first logic gate is directly connected to said data input; and
said second input of the second logic gate is coupled to said second input of said second logic gate through an intermediate logic gate.

* * * * *